United States Patent [19]
Hillyer

[11] 3,934,493
[45] Jan. 27, 1976

[54] EPICYCLIC CHANGE SPEED GEARS

[75] Inventor: Anthony William Hillyer, Loughborough, England

[73] Assignee: Raleigh Industries Limited, Nottingham, England

[22] Filed: Dec. 12, 1974

[21] Appl. No.: 531,964

[30] Foreign Application Priority Data
Dec. 15, 1973 United Kingdom............... 58416/73

[52] U.S. Cl............................. 74/750 B; 74/781 B
[51] Int. Cl.² ..................... F16H 3/44; F16H 57/10
[58] Field of Search ....... 74/750 B, 781 B; 192/6 A, 192/6 B

[56] References Cited
UNITED STATES PATENTS
2,441,989  5/1948  Brown .............................. 74/781 B
2,687,050  8/1954  Brown .............................. 74/750 B
3,438,283  4/1969  Schwerdhofer .................... 74/750 B
3,608,683  9/1971  Fujisawa ............................ 192/6 A Primary Examiner—Samuel Scott
Assistant Examiner—Lance W. Chandler
Attorney, Agent, or Firm—Lilling & Siegel

[57] ABSTRACT

A gear hub for a bicycle has two co-operating epicyclic gear trains selectively connectable together to a drive input means and to the gear hub under the control of an axially fixed, manually actuable rotatable cam operating on various pawls through axially shiftable cam followers to give a requisite drive transmission path through the gear trains appropriate to the gear ratio selected.

14 Claims, 7 Drawing Figures

Fig.2

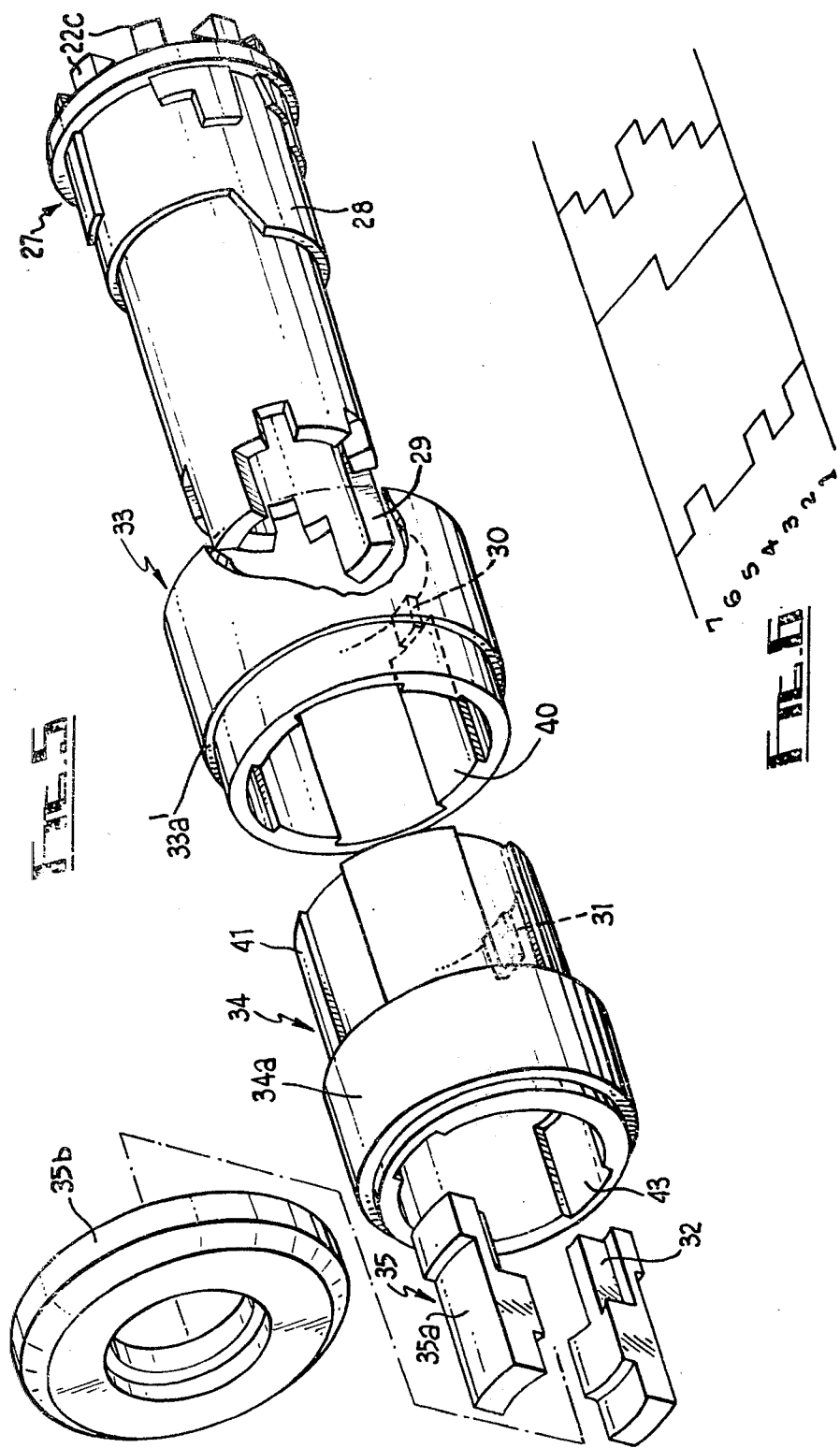

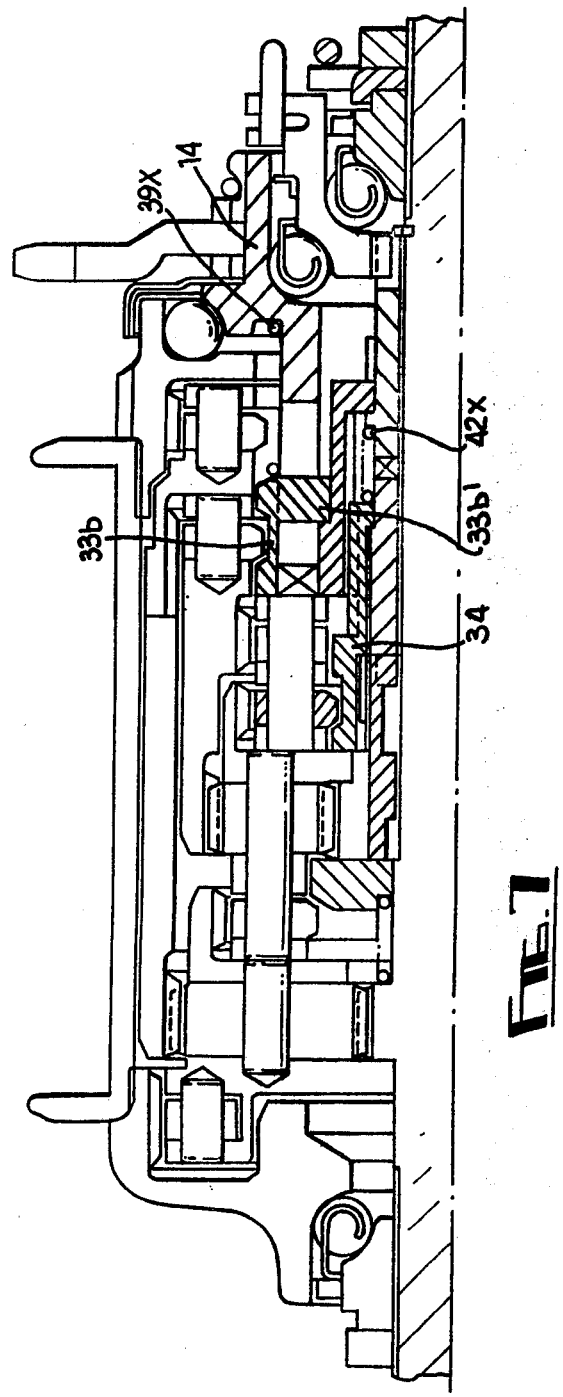

EPICYCLIC CHANGE SPEED GEARS

The invention concerns epicyclic change speed gear assemblies, and has more particular reference to epicyclic change speed gear hubs for bicycles, tricycles and other manually propelled vehicles.

The primary object of the present invention is to provide an improved epicyclic change speed gear hub as aforesaid.

According to the present invention an epicyclic change speed gear hub for a bicycle, tricycle or the like comprises first and second epicyclic gear trains arranged for operation about a common axis, uni directional clutch means between such gear trains adapted selectively drivingly to connect the same, first output uni directional clutch means adapted drivingly and selectively to connect the planet cages of the epicyclic gear trains with the hub shell, second output uni directional clutch means adapted drivingly and selectively to connect the gear rings of the epicyclic gear trains with the hub shell, input uni directional clutch means selectively co-operable with the respective epicyclic gear trains, a driver drivingly connected with the input uni directional clutch means and adapted to transmit a forward drive motion to the hub through such means, and a cam and a cam follower mechanism adapted, according to position relative to the axis of the hub, to control the relative conditions of the input and output uni directional clutch means selectively to give a drive transmission path through the hub consistant with requirements.

According to a preferred feature the cam and cam follower mechanism includes a body rotatably adjustable about the axis of the hub, such body having at least one cam form thereon, and a rotationally fixed cam follower in respect of each cam form, each cam follower being adapted to control the position of a respective cam actuator itself adapted to control the condition of a related one of the input and output uni-directional clutch means.

Preferably, each cam actuator is displaceable axially of the hub in controlling the condition of the related unidirectional clutch means.

The invention will now be described further by way of example only, with references to the accompanying drawings illustrating one embodiment thereof and in which:

Figure 2:
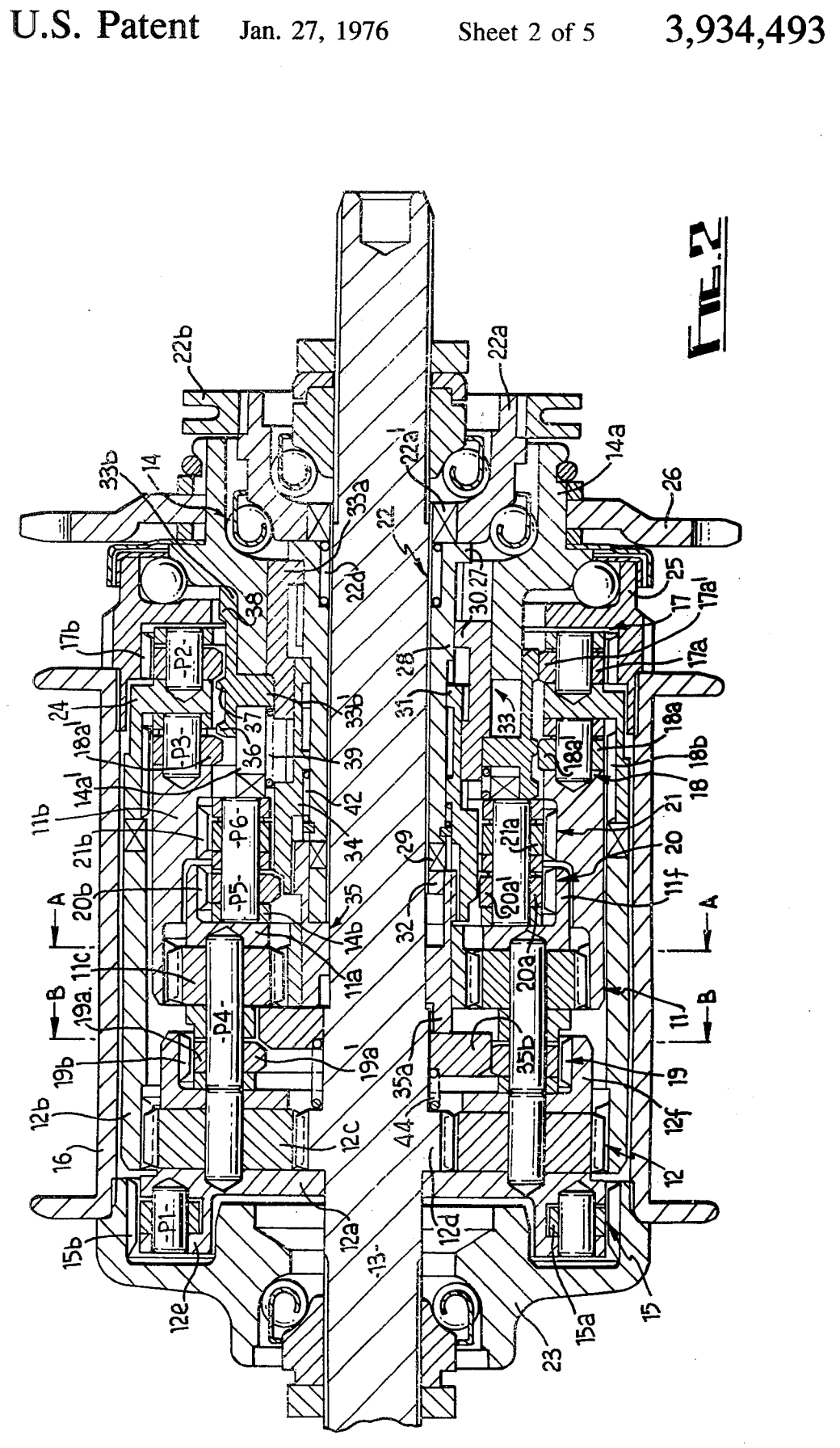

FIG. 2 shows, at that part thereof lying above the centre-line, a longitudinal section through the hub shown in FIG. 1 for a relative disposition of parts corresponding to a given gear condition of the hub, whilst that part lying below the centre-line corresponds to a different gear condition;

FIG. 5 is an exploded perspective view of the cam and cam follower parts of the hub shown in FIG. 1;

FIG. 6 is a developed view of the cam forms provided on the rotating cam of the hub; and FIG. 7 is a view corresponding to FIG. 2 and shows a modified form of the hub shown in FIGS. 1 to 6.

Figure 1:
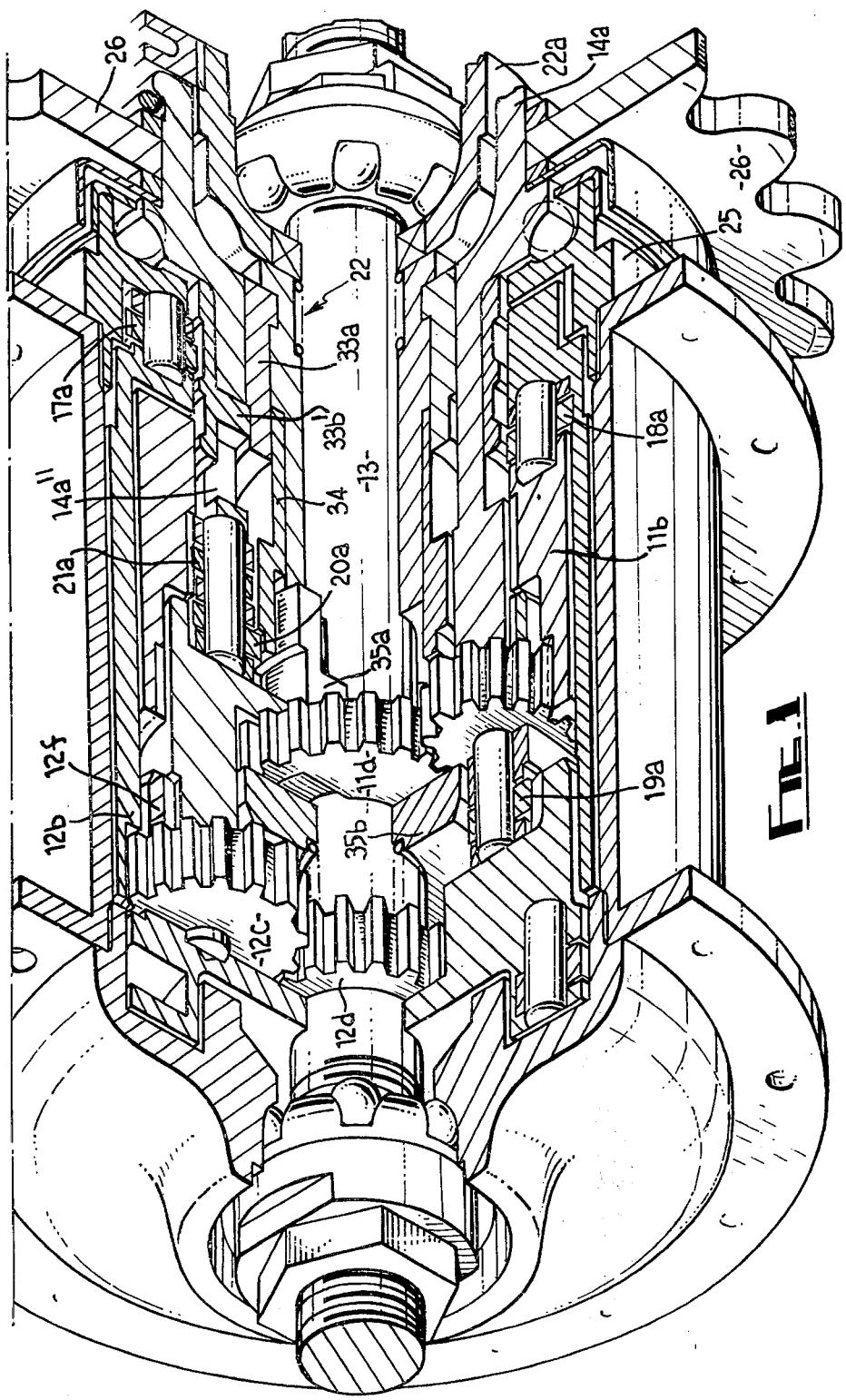
FIG. 1 is a cut-away perspective view of a seven-speed gear hub constructed in accordance with the present invention, certain elements being omitted for ease of illustration.
Figure 3:
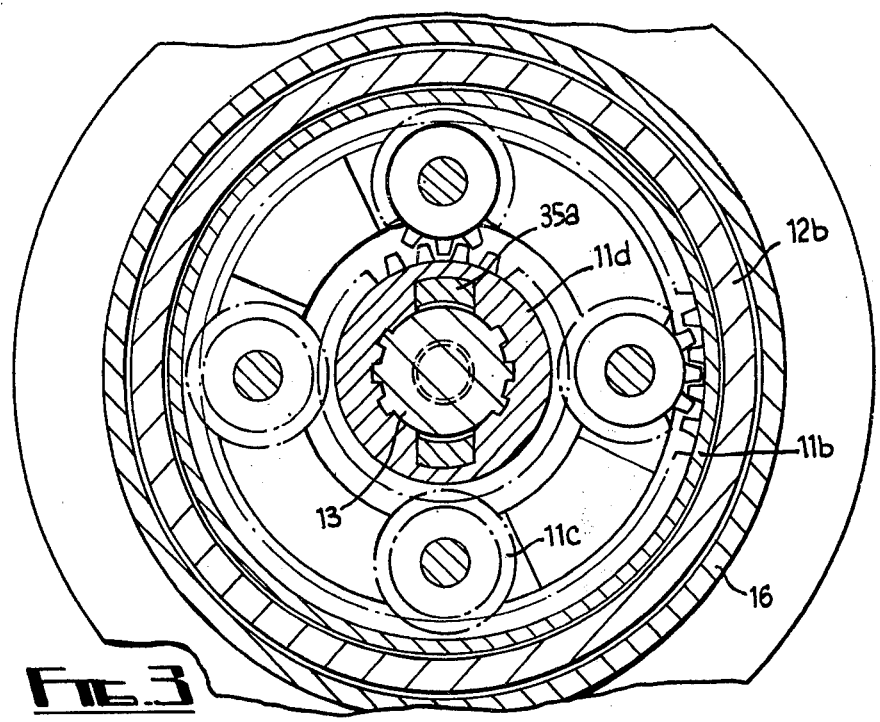
FIGS. 3 and 4 are sections corresponding to lines A—A and B—B respectively, of FIG. 2.
Figure 4:
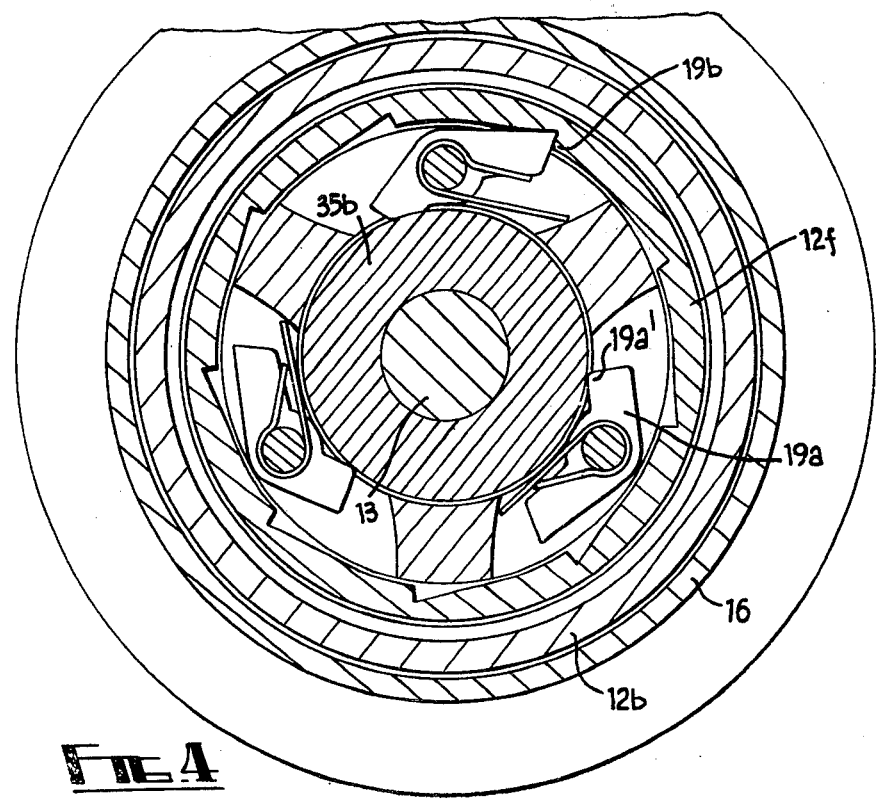

Referring now to the drawings, a seven speed hub comprises first and second epicyclic gear trains 11, 12 arranged in adjacent axial disposition upon an axle 13, a driver 14 drivingly connected with the first said epicyclic gear train 11, a first output pawl and ratchet means 15 between the planet cage 12a of the second epicyclic gear train 12 and the hub shell 16, a second such means 17 between the gear ring 12b of the second epicyclic gear train and the hub shell 16 and a third pawl and ratchet means 18, between the gear ring 11b of the first epicyclic gear train 11 and the gear ring 12b of the said second epicyclic gear train respectively. The hub also includes a first input pawl and ratchet means 19 between the planet cage 11a of the first epicyclic gear train and the planet cage 12a of the second such means, a second input such means 20 between the driver 14 and the planet cage 11a of the first epicyclic gear train and a third such means 21 between the driver 14 and the gear ring 11b of the first epicyclic gear train. A manually actuated cam and cam follower assembly 22 is provided coaxially with the hub and generally radially inwardly of the first and second epicyclic gear trains 11, 12 such assembly 22 being adapted, selectively, to control the operation of the various pawl and ratchet means 17, 18, 19 and 20.

The second epicyclic gear train 12 comprises the planet cage 12a and the gear ring 12b aforesaid, and further includes a plurality of the planet gears 12c rotatably supported in respective pockets in the planet cage and in mesh with a sun gear 12d formed on the hub axle 13. At its outer side face the planet cage is formed with an axial extension 12e to provide pockets to receive the pawls 15a of the first output pawl and ratchet means 15, such pawls cooperating with ratchet teeth 15b provided at an inner face of a ball cup 23 secured to the hub shell 16 at one end thereof as an end closure thereto. At its inner side face the planet cage 12a is formed with an axially extending peripheral flange 12f, the radially inner face of such flange being formed with ratchet teeth 19b for co-operation with the pawls 19a of the input pawl and ratchet means 19 between the planet cage of the first epicyclic gear train and the planet cage of the second such train. The gear ring 12b of the second epicyclic gear train is drivingly connected, via co-operating dogs, with a ratchet ring 24 arranged coaxially therewith, (the gear ring 12b and ratchet ring 24 may be formed as a single component, if preferred), the said ratchet ring being of stepped sleeve-like configuration and having pockets therein to receive respective ones of the pawls 17a of the second output pawl and ratchet means, the said pawls co-operating with ratchet teeth 17b provided at the radially inner face of a ball race 25 secured to the hub shell as an end closure thereto. The pawls 17a have tails 17a' which extend inwardly of the ratchet ring. The ratchet ring 24 also has radially inwardly facing ratchet teeth 18b for co-operation with the pawls 18a of the pawl and ratchet means 18, as will hereafter be disclosed in greater detail. The first epicyclic gear train 11 comprises the planet cage 11a and gear ring 11b aforesaid, and further includes a plurality of planet gears 11c rotatably supported in respective pockets in the said planet cage and in mesh with a sun gear 11d splined to the axle 13. At that side thereof facing the planet cage 12a of the second epicyclic gear train, the planet cage 11a is extended and is provided with pockets in radial register with the ratchet teeth 19b, each such pocket receive a respective pawl 19a for co-operation with the said ratchet teeth 19b. The pawls 19a have tails 19a' which extend radially inwardly of the planet cage. At its opposite side the planet cage 11a is provided with an axially extending peripheral flange 11f, the said flange having radially inwardly facing ratchet teeth 20b. The gear ring 11b of the first epicyclic gear train is arranged coaxially with and radially inwardly of the gear ring 12b and the ratchet ring 24, and, at a location in axial register with the ratchet ring 18b in such ratchet ring, is provided with pockets in which are located respective pawls 18a, the said pawls having tails 18a' which extend inwardly of the gear ring. Intermediate its ends the gear ring 11b is provided with internal ratchet teeth 21b, such teeth forming a part of the pawl and ratchet means 21 between the driver 14 and the gear ring 11b.

The driver 14 comprises inner and outer parts drivingly connected by co-operating dogs on the respective parts. The outer part 14a has a chain sprocket 26 secured thereto outwardly of the hub, whilst the dogs 14a' provided at its inner extremity are of elongate form to define slots 14a'' extending in the axial direction of the hub for a purpose hereafter to be made apparent. The inner part 14b has two axially spaced sets of pockets, one set of pockets being in axial alignment with the ratchet teeth 20b formed in the extension to the planet cage 11a and the other set being aligned with the ratchet teeth 21b provided inwardly of the gear ring 11b. That set of pockets aligned with the ratchet teeth 20b receives the pawls 20a, whilst the other pockets receive respective ones of the pawls 21a. Pawls 20a have tails 20a' which extend inwardly of the driver for a purpose hereafter to be made apparent.

The cam and cam follower assembly 22 includes an input member 22a having a cable pulley 22b secured thereto outwardly of the hub, a sleeve-like body 22c rotatably coupled to the input member by co-operating dogs 22a' 22c' on the two parts, a clock-type return spring 22d between the sleeve-like body and the hub axle, three cam forms 27, 28, 29 arranged at spaced locations axially of the body, cam followers 30, 31, 32 each co-operable with a respective one of the cam forms, and three pawl actuators 33, 34, 35 each associated with a respective one of the said cam followers. If preferred, the return spring 22d may be provided externally of the hub.

Pawl actuator 33 consists of a control sleeve 33a slidably axially of the sleeve-like body 22c and axially positioned relative thereto by co-operation of cam follower 30 provided internally at one end thereof with cam form 27, and an actuator member 33b slidably supported on the driver 14 and coupled to the control sleeve by radial dogs 33b' which extend radially inwardly through the slots 14a'' in the driver to engage a shoulder 33a' formed on control sleeve. The actuator member 33b is of sleeve-like form and has three peripheral ribs 36, 37, 38 at spaced axial locations thereon, the said ribs selectively co-operating with the tails 17a', 18a' of the pawls 17a, 18a according to the position of the actuator member axially of the hub. The relative disposition of the ribs upon the actuator member is such that pawl 18a can be tripped whilst pawl 17a remains in engagement with its related ratchet teeth 17b both pawls can be tripped, or both remain in their positions of engagement with the related ratchet teeth according to the axial position of the actuator member. A return spring 39 is provided between the dogs 33b' and the inner driver part.

The control sleeve 33a has internal splines 40 at that end thereof remote from the cam follower 30, such splines co-operating with corresponding external splines 41 on pawl actuator 34.

Pawl actuator 34 is similarly of sleeve-like form and cam follower 31 is provided at the inner periphery thereof and at that end thereof closer to the input member 22a, that end of the actuator 34 remote from the input member 22a being of increased outside diameter, the extremity of such end being formed with a step 34a for co-operation with the tail 20a' of pawls 20a to trip such pawl on axial shift of the actuator by the cam form 28 and cam follower 31 in an appropriate sense. A return spring 42 is provided between a shoulder at the inner face of the actuator member and a suitable abutment on the sleeve-like body 22c.

That end of the actuator 34 remote from the cam follower 31 is provided with two diametrically opposed grooves 43 slidably to receive respective connecting links 35a of pawl actuator 35.

Pawl actuator 35 comprises the connecting links 35a aforesaid and a pawl actuator ring 35b, the actuator ring being displaceable axially of the hub by the connecting links, against the restraint of a return spring 44 provided between the sun gear 12d and the actuator ring, into contact with the tails 19a' of pawls 19a so as to trip the same. If desired, the connecting links 35a may be joined together at that end thereof which engages pawl actuator 34. The radially inner face of each connecting link presents the cam follower 32 and the extent of axial engagement of the links with the pawl 34 is such that the cam follower 32 is co-operable with the related cam form 29, the axial position of the links, and thus of the actuator ring, being determined by the cam form and cam follower.

The sun gear 11d is apertured at diametrically opposed locations thereon to provide passage therethrough of the connecting links, the various cam actuators thereby being precluded from rotation about the hub axle.

The rotation of the sleeve-like body 22c about the axle is restricted by co-operating abutments 29 on the said body and on the connecting links 35a.

The relative angular dispositions of the various cam forms are shown in FIG. 6 and are such as to adjust the pawl actuators to give the following combinations of pawl condition for the various gears, in indicating an engaged pawl and out a disengaged pawl and the controllable pawls 17a, 18a, 19a and 20a being designated P2, P3, P4 and P5 respectively:

|  | P2 | P3 | P4 | P5 |
| --- | --- | --- | --- | --- |
| GEAR 7 (High) | In | In | Out | In |
| GEAR 6 | In | Out | In | In |
| GEAR 5 | Out | In | Out | In |
| GEAR 4 | In | In | Out | Out |
| GEAR 3 | In | Out | In | Out |
| GEAR 2 | Out | In | Out | Out |
| GEAR 1 | Out | Out | In | Out |

The drive transmission paths for the various gears are as follows, pawls 15a and 21a being designated P1 and P6:

GEAR 1 :- Driver 14 - Pawl P6 - Gear Ring 11b - Through first Epicyclic gear train - Planet cage 11a - Pawl P4 - Planet cage 12a - Pawl P1 - Ball Cup 23 - Hub Shell 16.

GEAR 2 :- Driver 14 - Pawl P6 - Gear Ring 11b - Pawl P3 - Gear Ring 12b - Through second epicyclic gear train - Planet Cage 12a - Pawl P1 - Ball Cup 23 - Hub Shell 16.

GEAR 3 :- Driver 14 - Pawl P6 - Gear Ring 11b - Through first epicyclic gear train - Planet Cage 11a - Pawl P4 - Planet Cage 12a through second epicyclic gear train - Gear Ring 12b - Pawl P2 - Ball Ring 25 - Hub Shell 16.

GEAR 4 :- Driver 14 - PAWL P6 - Gear Ring 11b - Pawl P3 - Gear Ring 12b - Pawl P2 - Ball Ring 25 - Hub Shell 16.

GEAR 5 :- Driver 14 - Pawl P5 - Planet Cage 11a - Through First Epicyclic Gear Train - Gear Ring 11b - Pawl P3 - Gear Ring 12b - Through Second Epicyclic Gear Train - Planet Cage 12a - Pawl P1 - Ball Cup 23 - Hub Shell 16.

GEAR 6 :- Driver 14 - Pawl P5 - Planet Cage 11a - Pawl P4 - Planet Cage 12a - Through second Epicyclic Gear Train - Gear Ring 12b - Pawl P2 - Ball Ring - Hub Shell 16.

GEAR 7 :- Driver 14 - Pawl P5 - Planet Cage 11a - Through first Epicyclic Gear Train - Gear Ring 11b - Pawl P3 - Gear Ring 12b - Pawl P2 - Ball Ring - Hub Shell 16.

Adjustment between the various gears is effected by rotation of the input member 22a against the restraint of the clock-type spring between the sleeve and the axle, the provision of the spring avoiding the need to use two cables on a control mechanism, e.g. a gear lever.

In a modification of the hub a single cam follower is provided on each of the pawl actuators 33, 34 and 35, thereby permitting the use of a more favourable cam slope between successive gear positions, as distinct from the two symmetrically disposed followers provided on the relevant elements of hub illustrated in FIGS. 1 to 5.

A still further modification comprises the reversal of various of the spring actions against which the pawl actuators are shifted axially, this latter feature being apparent from FIG. 7 of the drawings, the relevant springs being indicated by like reference numerals to those of the springs in the embodiment of FIG. 1, with the suffix x applied thereto, and the related parts being appropriately modified to accommodate the changed spring action.

The invention is not restricted to the exact features of the embodiment described and illustrated, since alternatives will readily present themselves to one skilled in the art.

Thus, for example, whereas in the case of the embodiment illustrated, the drive path to the cam and cam follower assembly 22 passes between the axle cone 45 and the driver 14, it may be preferred, in some instances to control the angular position of the sleeve-like body 22c through the centre of the axle, in a similar manner to the gear selection in many conventional epicycle change-speed hubs.

It is to be understood that, instead of the various pawl and ratchet mechanisms, it may be found more convenient, in some instances, to use some alternative uni-directional clutch means.

What is claimed is:

1. An epicyclic change-speed gear hub for a bicycle, tricycle or the like comprises first and second epicyclic gear trains arranged for operation about a common axis, uni-directional clutch means between such gear trains adapted selectively drivingly to connect the same, first output uni-directional clutch means adapted drivingly selectively to connect the planet cages of the epicyclic gear trains with the hub shell, second output uni-directional clutch means adapted drivingly and selectively to connect the gear rings of the epicyclic gear trains with the hub shell, input uni-directional clutch means selectively co-operable with the respective epicyclic gear trains, a driver drivingly connected with the input uni-directional clutch means and adapted to transmit a forward drive motion to the hub through such means, and a cam and cam follower mechanism adapted, according to position relative to the axis of the hub, to control the relative conditions of the input and output uni-directional clutch means selectively to give a drive transmission path through the hub consistent with requirements.

2. An epicyclic change-speed gear hub as claimed in claim 1, wherein the cam and cam follower mechanism includes a body rotatably adjustable about the axis of the hub, such body having at least one cam form thereon, and a rotationally fixed cam follower in respect of each cam form, each cam follower being adapted to control the position of a respective cam actuator itself adapted to control the condition of a related one of the input and output uni-directional clutch means.

3. An epicyclic change-speed hub as claimed in claim 2 wherein the body of the cam and cam follower mechanism has three cam forms arranged in axially spaced disposition thereon.

4. An epicyclic change-speed hub as claimed in claim 2 wherein each cam actuator is adapted to be displaceable axially of the hub in controlling the condition of the related uni-directional clutch means.

5. An epicyclic change-speed hub as claimed in claim 2, wherein a plurality of cam actuators is present and such cam actuators are relatively movable in the axial direction of the hub.

6. An epicyclic change-speed gear hub as claimed in claim 2, wherein each cam follower is resiliently biassed into contact with its respective cam and is maintained in such contact for all conditions of the hub.

7. An epicyclic change-speed gear hub as claimed in claim 1 wherein the uni-directional clutch means drivingly connecting the first and second epicyclic gear trains comprises a uni-directional clutch means between the planet cages of the respective epicyclic gear trains, and the cam and cam follower mechanism is adapted selectively to control the condition of such clutch means.

8. An epicyclic change-speed gear hub as claimed in claim 7, wherein the cam and cam follower mechanism includes an actuator ring co-operable with such uni-directional clutch means to control the condition thereof.

9. An epicyclic change-speed gear hub as claimed in claim 8, wherein the actuator ring is located between the respective sun gears of the epicyclic gear trains in the axial direction of the hub and the cam actuator for such ring extends through one sun gear in the said axial direction.

10. An epicyclic change-speed gear hub as claimed in claim 1 wherein each cam follower comprises two cam follower elements at a respective common axial location, the said elements being arranged in diametrically opposed disposition relative to the axis of the hub.

11. An epicyclic change-speed hub as claimed in claim 1 wherein the cam and cam follower mechanism includes a cam body rotatably adjustable about the axis of the hub, rotation of the said cam body relative to the hub axle being adapted to be effected by means extending outwardly of the hub between the driver and hub axle.

12. An epicyclic change-speed hub as claimed in claim 11, wherein the said means comprises an input member operatively connected with a manually actuable adjustment means.

13. An epicyclic change-speed hub as claimed in claim 12, wherein the manually actuable adjustment means comprises a control cable co-operable with a pulley connected with the input member and adapted to effect rotation of the latter upon longitudinal adjustment of the control cable.

14. An epicyclic change-speed hub as claimed in claim 1, including a return spring between the cam of the cam and cam follower mechanism biassing such cam to a datum position.

* * * * *